Dec. 24, 1963  P. LAWS  3,115,331
EXPANSION TURBINES
Filed Aug. 9, 1960  2 Sheets-Sheet 1

INVENTOR
Peter Laws
BY
ATTORNEYS

Dec. 24, 1963    P. LAWS    3,115,331
EXPANSION TURBINES
Filed Aug. 9, 1960    2 Sheets-Sheet 2
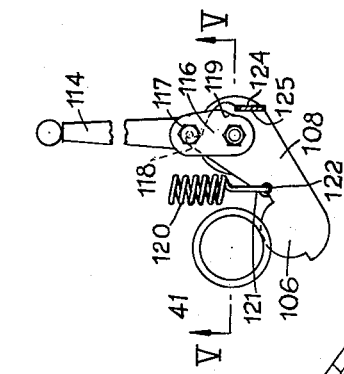
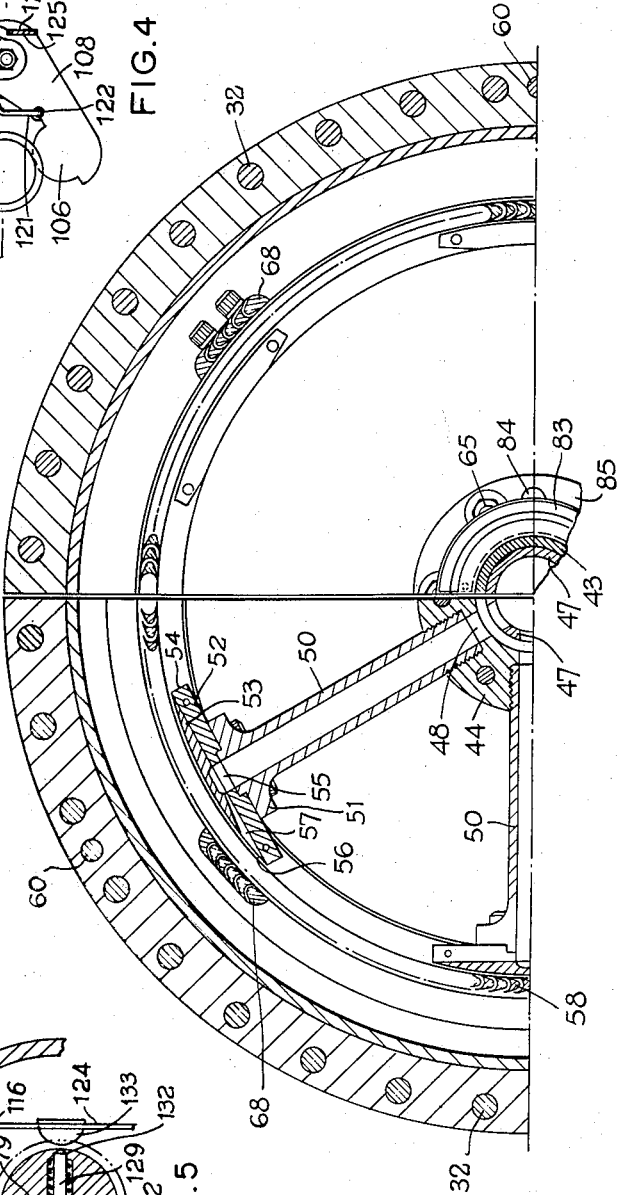
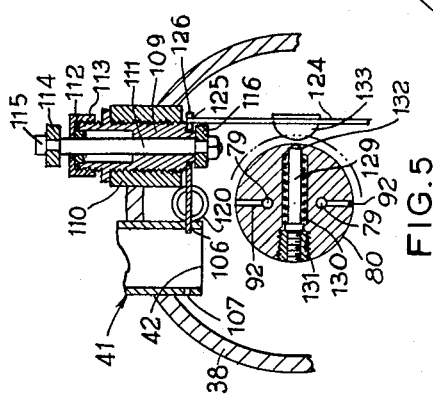
INVENTOR
Peter Laws
BY Johnson and Kline
ATTORNEYS United States Patent Office 3,115,331
Patented Dec. 24, 1963

3,115,331
EXPANSION TURBINES
Peter Laws, 55 Gloucester Ave., London NW. 1, England
Filed Aug. 9, 1960, Ser. No. 48,494
5 Claims. (Cl. 253—82)

This invention relates to expansion turbines, for medium range horse power output ranges. It is an object of the present invention to provide a turbine construction which is compact and which is comparatively light in weight as compared with constructions of conventional design for the same power output ranges.

According to the present invention there is provided an expansion turbine comprising an output shaft, a hollow shaft axially aligned with the output shaft, constituting a motive fluid inlet conduit, at least one hollow arm extending radially of the shafts, and connected to rotate therewith, the arm terminating in an expansion nozzle and communicating with the interior of the hollow shaft, a rotor carrying at least one set of movable blades connected to both the hollow shaft and the output shaft, and at least one ring of fixed blades positioned so as to receive and direct motive fluid from the nozzle or nozzles to the rotor blades which are located opposite to the nozzle or nozzles.

For a better understanding of the invention and to show how the same may be carried into effect reference will now be made to the accompanying drawings in which:

FIGURE 2 is a section to an enlarged scale taken on the line II—II of FIGURE 1;

FIGURE 3 is a section to an enlarged scale taken on the line III—III of FIGURE 1;

FIGURE 4 is an elevation to an enlarged scale taken on the line IV—IV of FIGURE 1, and FIGURE 5 is a section to an enlarged scale taken on the line V—V of FIGURE 4.

Figure 1:
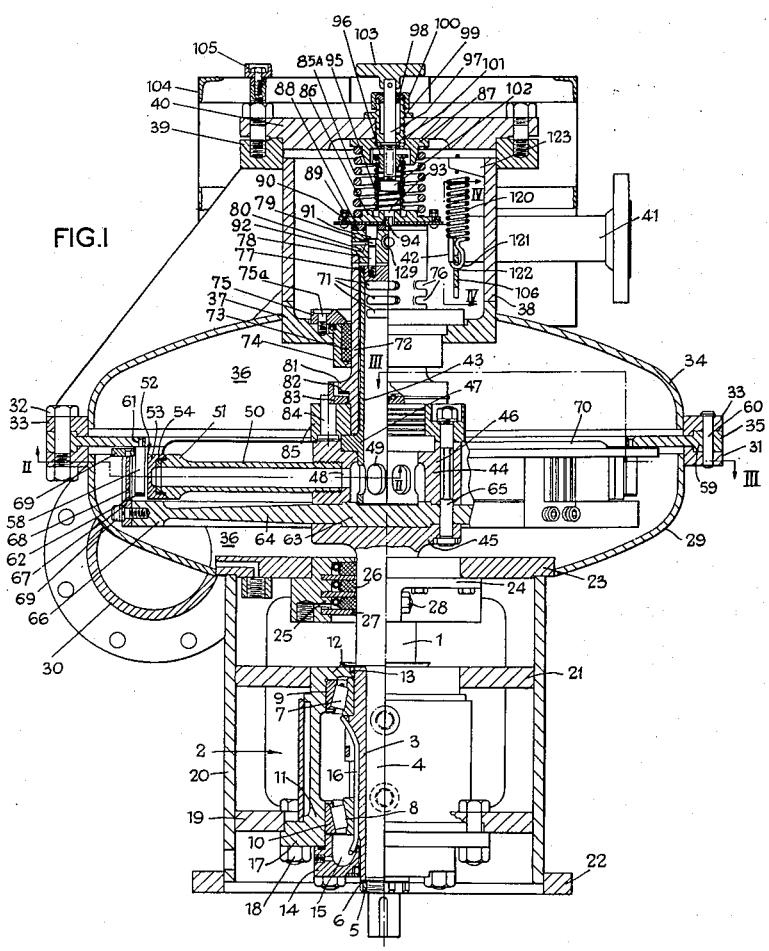
FIGURE 1 is a sectional elevation of an expansion turbine.

The turbine shown in the drawings is a reaction turbine having a vertical shaft or spindle, the output spindle or shaft 1 of which is journalled in a single bearing assembly 2 of the kind disclosed in co-pending application Number 48,495, now Patent No. 3,061,387, granted October 30, 1962.

Briefly, the bearing assembly 2 includes a sleeve 3 which is a snug fit upon a reduced diameter end portion 4 of the output shaft or spindle 1 and which is held on the shaft by a locking nut 5 and washer 6. The sleeve 3 provides seatings for two axially spaced anti-friction bearings 7 and 8, whose outer races 9 and 10 are seated in a second sleeve 11 concentric with the sleeve 3. The upper end of the sleeve 11 has an inwardly directed flange 12 which has a running clearance with the sleeve 3, there being an oil seal 13 between the flange 12 and the sleeve 3. An annular cover plate 14 is connected to the lower end of the sleeve 11. The inner portion of the cover plate 14 makes a running clearance with the lower end of the sleeve 3.

The cover plate 14 is adapted to provide a lubricant reservoir 15 for a lubricating device including a vertical small bore tube or conduit 16 dipping into the reservoir 15. An outwardly directed annular flange 17 is provided at the lower end of the sleeve 11 which flange 17 is secured by nuts and bolts 18 to an inwardly directed horizontal plate 19 which is welded to the inside face of a vertical cylindrical tube 20. A second horizontal plate 21 is welded to the tube 20 in such a position that the uppermost end of the sleeve 11 is a push fit in the plate 21. The remaining features of the assembly 2 will not be described in detail in this specification.

An outwardly directed flange 22 is welded to the lowermost end of the tube 20. A flat annular plate 23 is welded to the uppermost end of the tube 20, which plate 23 is utilised to support a housing 24 for a carbon ring gland 25 for the output shaft 1 of the turbine. The carbon ring gland 25 includes a stack of interleaved gland packings 26 and gland discs 27 located in the housing 24. The housing 24 is formed from two separate sections which are connected together by nuts and bolts 28.

A dished plate 29 is welded to the plate 23 at the upper end of the tube 20. The dished plate 29 serves as the exhaust side of the turbine casing and is provided with an exhaust outlet duct 30.

An annular ring 31 is welded to the periphery of the dished plate 29, the annular ring 31 being bolted by a plurality of equiangularly disposed nuts and bolts 32 (one being shown) to a similar ring 33 welded to the periphery of a second dished plate 34 which is inverted with respect to the dished plate 29. An annular plate 35 is interposed between the two rings 31 and 33, and is bolted thereto by means of the nuts and bolts 32, the annular plate 35 extends into the chamber 36 defined by the dished plates 29 and 34.

The upper part of the dished plate 34 is welded to an annular element 37 having an L-shaped cross-section. The vertical arm of the L is welded to a second cylindrical tube 38 whose uppermost end is welded to an outwardly directed flange 39 which serves as a means whereby a cover plate 40 can be bolted to the tube 38. The tube 38 acts as the steam chest of the turbine. A horizontally extending live steam inlet pipe 41 connects with the tube 38, the inner end 42 of the inlet pipe extending into the interior of the tube 38.

A vertical hollow shaft 43 acting as a steam inlet conduit extends from the steam chest, through the base thereof, the latter being formed by the horizontal arm of the element 37.

The lowermost end of the shaft 43 engages in a nozzle hub 44 which is bolted to a hub 45 provided at the upper end of the output shaft 1. The nozzle hub 44 is formed by a thick walled cylindrical element 46 having an annular recess which forms a seating for an annular flange 47 provided at the lower end of the shaft 43, the latter being a snug fit within the hub element with the flange 47 abutting the base of the recess therein. Six equiangularly spaced radially directed through bores 48 are formed in the element 46, the innermost end of each of the bores aligning with an aperture 49 formed in the lowermost end of the shaft 43.

The inner end of a radially directed tubular nozzle arm 50 is securely inserted in each one of the through bores 48, the internal diameter of the outer end of each bore 48 being increased so as to accommodate the inner end of the nozzle arm 50. The six arms 50 are dynamically balanced about the longitudinal axis of the output shaft 1.

The outermost end of each nozzle arm 50 terminates in a flange 51 which serves as a mounting for a tangentially directed expansion nozzle 52 designed to provide a degree of pure reaction thrust. Each expansion nozzle is formed from two separate sections 53 and 54 which are secured to each other by pinning or riveting. A rectangular nozzle groove, or passage 55 is formed in the section 53, which passage 55 may be ground or otherwise formed to a desired profile, to provide a tangentially directed steam outlet 56. The outermost face of the one section 53 has a cylindrical profile, whose axis of curvature is coincident with the axis of rotation of the output shaft 1.

The other section 54 is a filler or backing plate which forms the inner wall 57 of the expansion nozzle 52.

The flanged part 51 of the nozzle arm is arranged so that the expansion nozzle 52 is in communication with the interior of the arm 50.

The expansion nozzles 52 co-operate with a ring of fixed vertical stator blades 58, the blades 58 being secured at equi-angularly spaced intervals to the inner periphery of the ring 35 which has an annular part 59 of thicker cross-section interposed between the flanges 31 and 33. As previously mentioned nuts and bolts 32 holding these flanges 31 and 33 together also serve to clamp the ring 35 in position. However, in order to position the ring 35 in a pre-set angular position with respect to the dished plates 29 and 34, the three substantially equi-angularly spaced dowels 60 (only one being shown) are utilised as locating members, the dowels 60 being a force fit in the outwardly directed flanges 31 and 33.

The root 61 of each vertical blade 58 is secured in the ring 35, and the tip or lower end of each vertical blade 58 is connected to a blade shroud ring 62. This arrangement ensures that the blades 58 remain correctly positioned relative to each other.

The hub 63 of the rotor 64 of the turbine is interposed between the hub 45 at the upper end of the output shaft 1, and the element 46 is bolted thereto by bolts 65 connecting the output shaft hub 45 to the nozzle hub 44.

The rotor 64 is constituted by a wheel having a rim 66 of thickened cross-section. Six equi-angularly spaced sets, or packets 67, of moving blades 68 are firmly secured to the rim by bolts 69. The moving blades 68 are vertical and are located just outside the outer faces of the stator blades 58.

Each packet 67 of rotor blades 68 is located in such a position that the blades functionally co-operate with the reaction nozzles 52 carried on the nozzle arms 50.

The upper end of each of the blades 68 is secured to a blade supporting ring 69 which serves to prevent relative movement between the blades 68.

A metal dished fairing 70 is provided above the nozzle arms 50, the inner part of the fairing engaging with the nozzle hub 44, the inner part being gripped between a flange 85 and the hub 44. The outer part of the fairing 70 engages with the ends of the nozzle arms 50.

A number of transverse horizontal slots 71 are formed in the uppermost end of the shaft 43, the slots forming the live steam inlet ports. The shaft 43 is surrounded by a sleeve 72 which is constrained to rotate with the shaft 43 but is axially movable with respect to the shaft 43. The sleeve 72 passes through an internal gland 73 formed by carbon graphite seals, the gland being located in a housing 74 which is supported by the horizontal arm of the flange 37, and which is held in position by a retaining ring 75 which is secured by bolts 75a to the flange. Steam inlet ports 76 are formed in the upper part of the sleeve 72. The ports 76 are positioned and dimensioned so that they can co-operate fully with the transverse ports 71 in the upper end of the shaft 43.

The top of the shaft 43 is closed by a cylindrical cover plate 77. Two vertical dowels are located in the cover plate 77, the dowels slidably engaging bores 79 formed in a second cover plate 80 which closes off the upper end of the sleeve 72. The dowels 78 prevent the sleeve 72 from rotating relative to the shaft 43 but permit the sleeve to move axially of the shaft 43.

An outwardly directed annular flange 81 is provided at the lower end of the sleeve 72. The lower surface of the flange is covered by a bearing or thrust plate 82 which co-operates with two semi-circular governor weights 83. Each weight 83 is pivotally mounted for pivotal movement about a horizontal axis (not shown) on a pin 84 which is mounted upon the nozzle hub 44 by means of a flange 85 which is secured to the element 46 by the bolts 65 which secure the nozzle hub to the output shaft 1. The weights 83 have an L-shaped cross-section and are arranged so that one limb will contact with the thrust plate 82 to urge the sleeve 72 upwardly as the speed of the shaft increases. The upward movement of the sleeve 72 produces relative movement between the ports 71 and 76. The upward movement is resisted by the governor main spring 85A the latter being a compression spring whose lower end bears upon a lower spring plate 86 and whose upper end bears upon an upper spring plate 87 which abuts the underside of the cover plate 40.

A thrust pad 88 is secured by nuts and bolts 89 to the underside of the lower spring plate, the thrust pad co-operating with a thrust washer 90 located on the upper surface of the cover plate 80. The thrust washer 90 is located relative to the cover plate by two dowels 91 which are housed in the cover plate, the dowels extending axially of the dowels 78 provided in the cover plates 77 and 80. The spaces between the pairs of dowels 78 and 91 communicate with the surrounding atmosphere via pressure balancing bores 92.

The lower spring plate 86 has a central bore 93 which is engaged by spigot 94 projecting from the cover plate 80 thereby preventing undue transverse relative movements between the lower spring plate and the cover plate.

The spring loading exerted on the sleeve 72 is adjustable by means of an auxiliary compression spring 95 concentric with the spring 85A. The lowermost end of the spring 95 bears upon the lower spring plate 86 whilst the upper end of the spring 95 bears against a nut 96 carried upon a screwed spindle 97 rotatably mounted in the cover plate 40. The spindle 97 enters the steam chest via a gland 98 located in a gland housing 99 closed by a gland nut 100, the housing 99 being screwed into the cover plate 40 and into the upper part of the upper spring plate 87. An outwardly directed peripheral flange 101 on the spindle is interposed between the gland housing 99 and the upper spring plate 87. This arrangement stops the spindle 97 moving axially of the cover plate 40. A stop nut 102 is secured to the lower end of the spindle 97. A control wheel 103 is secured to the upper end of the spindle. Manual rotation of the wheel turns the spindle and in so doing either moves the nut 96 downwardly or upwardly. Downward movement of the nut 96 increases the pressure exerted upon the lower spring plate 86 and thus upon the sleeve 72. Upward movement of the nut 96 decreases the pressure exerted upon the lower spring plate and thus upon the sleeve 72. The upper part of the steam chest is enclosed in a casing 104 which is bolted to the cover plate 40 by bolts 105.

The turbine is provided with an overspeed trip device which is arranged to cut-off steam supply from the pipe 41. The overspeed trip device includes a pivotally mounted plate valve 106 which is arranged to engage a slot 107 formed in the inner end 42 of the pipe 41, the slot being normal to the axis of the pipe and extending over half of its diameter.

The plate valve 106 is so shaped that it will completely close the steam inlet pipe 41. The plate valve 106 has an extended arm or part 108 which is pivotally mounted on a flanged sleeve 109 which is located in a gland body 110 welded to the tube 38, the axis of the sleeve 109 being parallel to that of the inlet pipe 41. A spindle 111 is rotatably mounted in the sleeve 109. The outer end of the spindle passes through a gland 112 in the sleeve 109 which gland 112 is held in position by a gland nut 113. The outer end of the spindle has a squared part which serves as a mounting for a handle 114 the latter being retained on the spindle 111 by a nut 115.

The inner end of the spindle 111 has a squared part upon which is mounted a cam plate 116. Rotation of the handle 114 will rotate the cam plate 116. The cam plate carries a peg 117 which is engageable with a projection 118 provided on the arm 108 of the plate valve 106. A projection 119 is formed on the cam plate.

The plate valve is spring loaded towards its closed position by a spring 120 having a hook-like lower end 121 which engages a bore 122 in the plate valve. The upper end of the spring is attached to a bracket 123 secured to the wall of the tube 38.

The plate valve is held in its open position by the free end 124 of a spring latch 125, the latter engaging a notch 126 in the arm 108 of the plate valve. The other end (not shown) of the latch 125 is fixedly mounted within the tube 38.

Rotation of the handle 114 in one direction will cause the projection 119 to move the latch end 124 out of the notch, whereupon the spring 120 will immediately move the plate valve 106 to its closed position. Rotation of the handle 114 in the reverse direction will cause the peg 117 to engage with the projection 118 and thus rotate the valve plate 106 against its spring loading until the latch end 124 engages the notch 126, to hold the plate valve in its open position.

An eccentric bolt device 128 is provided for automatically moving the latch end out of engagement from the notch 126, when the speed of the turbine attains a predetermined value. A bolt device 128 includes a bolt 129 which is slidable in a transverse bore formed in the cover plate 80 of the hollow sleeve 72. The bolt 129 is resiliently loaded by a spring 130, the initial loading of which is selectively adjustable by a bolt 131. The length of the bolt is such that when the sleeve 72 is at rest the end 132 of the bolt is in a retracted position as is shown in FIGURE 5. When the sleeve is rotating the centrifugal force acting on the bolt 129 tends to move the bolt radially relative to the cover plate 40, against the loading of the spring 130.

A contact member 133 is mounted on the latch spring 125 in such position that the end 132 of the bolt will strike the member 133 when the speed of the sleeve is at or above a predetermined value, the latter depending upon the initial loading of the spring 130. As soon as the bolt 129 strikes the contact member the latch spring end 124 is caused to disengage from the notch 126, thereby allowing the plate valve to move to its closed position under the action of the spring 120 so as to cut off motive fluid supply, and thus reduce the speed of the turbine rotor. During the closure movement of the plate 106 the engagement of the projection 118 with the peg 117 causes the handle 114 to rotate with the plate valve 106, this handle movement being possible since the handle 114 and the plate valve 106 have a common axis of rotation.

In operation of the turbine steam passes through the inlet pipe 41, into the steam chest 38, and from the latter via the ports 76 and the slots 71 into the hollow shaft 43. The rate of flow via the ports and slots is controlled by the relative axial positioning of the sleeve 72 and the hollow shaft 43. The steam passes through the shaft and issues from the ports 49 and enters the bores 48. The steam travels along the hollow arms 50 and expands from the nozzle openings 56. The steam strikes the blades 58 and is redirected by these blades onto the rotor blades 68 in such direction that the impulse imparted to the rotor blades is in the same direction as the reaction impulses exerted on the nozzle arms, thereby rotating the rotor and thus the output shaft. The steam finally flows out through the exhaust duct 30.

Whilst the embodiment shown in the drawings and described with reference to those drawings is a vertical turbine it will be realised that the construction described is applicable to a turbine otherwise orientated e.g. horizontal although in the case of a horizontal turbine a different bearing assembly would be used. Again the embodiment shown and described has been described with particular reference to operation by steam. However any other motive fluid could be employed using the same construction except so far as those parts which are provided specifically for dealing with steam as the operative fluid. For example with some operating fluids it may be unnecessary to make provision for the steam chest 38. The main features, however, which are the subject of the invention are operative whether the operating fluid be steam or any other motive fluid.

What I claim is:

1. An expansion turbine comprising an output shaft, a hollow shaft axially aligned with the output shaft and constituting a motive fluid inlet conduit, at least one hollow arm extending radially of the shafts and having one end connected to the hollow shaft to be in communication with the interior thereof and to rotate therewith, an expansion nozzle formed at the outer end portion of the arm, a rotor connected to the output shaft and having a set of movable blades secured thereon to be located opposite the nozzle, at least one ring of fixed blades secured against movement between the nozzle and the movable blades so as to receive and direct motive fluid from the nozzle to the movable blades, means connectible to a source of motive fluid, centrifugally actuatable speed regulating means connected between the last-named means and the hollow shaft for controlling the through-put of motive fluid through the hollow shaft to the nozzle to thereby maintain a speed of the output shaft, said speed regulating means including a sleeve surrounding and rotating with the hollow shaft and mounted for axial movement relative to the hollow shaft, complementary ports formed in the sleeve and the hollow shaft and being positioned in the path of motive fluid from the source into the hollow shaft, governor means including governor weights connected to rotate with the hollow shaft and movable to engage and directly actuate the sleeve to axially move the sleeve to urge the closing of the ports, spring means operatively connected to the sleeve for directly resisting the closing force of the governor weights and manually adjustable spring means operatively connected to the sleeve and including at least one spring whose resistive force is adjustable, independently of the sleeve, and operative during the initial closing movement of the sleeve whereby the speed of operation of the output shaft maintained by the speed regulating means may be adjusted during operation of the turbine without directly causing movement of the sleeve.

2. The invention as defined in claim 1 in which there is provided, independently of the speed regulating means, an overspeed trip device including an eccentric bolt rotatable with the shafts and movable outwardly therefrom with rotation of the shafts, a valve position between the hollow shaft and the means connectible to a source of motive fluid to control fluid passage therebetween and being normally urged to its closed position, a spring trigger latch normally holding the valve in its open position and means mounting the spring trigger latch in the path of movement of the bolt to be actuated by the bolt to release the latch to cause the valve to close.

3. An expansion turbine as claimed in claim 2, wherein the valve is a spring loaded plate movable into a slot formed in a pipe connected between the hollow shaft and the means connectible to a source of motive fluid.

4. An expansion turbine as claimed in claim 3, wherein there is provided manually actuated cam means connected to the spring trigger latch for moving the latch to reset the valve to its open position after the latter has been closed.

5. An expansion urbine as claimed in claim 4, wherein the cam means includes an actuatable member adapted to actuate the spring trigger latch to close the valve independently of the overspeed trip device.

References Cited in the file of this patent

UNITED STATES PATENTS

| | | |
|---|---|---|
| 603,660 | Seavor | May 10, 1898 |
| 649,859 | O'Connell | May 15, 1900 |
| 811,663 | Reeves | Feb. 6, 1906 |
| 1,329,515 | Egger | Feb. 3, 1920 |
| 1,331,416 | Cockburn et al. | Feb. 17, 1920 |
| 1,433,534 | Dake | Oct. 31, 1922 |
| 1,471,076 | Ver Planck | Oct. 16, 1923 |
| 2,485,514 | Sturrock | Oct. 18, 1949 |
| 2,840,341 | Hudyma | June 24, 1958 |

OTHER REFERENCES

Croft, Terell: Steam-Turbine Principles and Practices, New York, McGraw-Hill, 1923, pp. 123–124, 128–130, 136–143.